(12) United States Patent
DeCusatis et al.

(10) Patent No.: US 9,079,369 B2
(45) Date of Patent: Jul. 14, 2015

(54) ENHANCED SEPARATION OF INJECTION MOLDED MICROLENSES FOR HIGH VOLUME MANUFACTURING

(75) Inventors: Casimer M. DeCusatis, Poughkeepsie, NY (US); Lawrence Jacobowitz, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1029 days.

(21) Appl. No.: 12/603,565

(22) Filed: Oct. 21, 2009

(65) Prior Publication Data

US 2011/0089590 A1  Apr. 21, 2011

(51) Int. Cl.
| | | |
|---|---|---|
| B29D 11/00 | (2006.01) | |
| B29C 33/44 | (2006.01) | |
| B29C 37/00 | (2006.01) | |
| B29C 35/08 | (2006.01) | |

(52) U.S. Cl.
CPC .......... *B29D 11/00365* (2013.01); *B29C 33/44* (2013.01); *B29C 37/0003* (2013.01); *B29C 37/0067* (2013.01); *B29D 11/00201* (2013.01); *B29C 35/0888* (2013.01); *B29C 2035/0827* (2013.01)

(58) Field of Classification Search
CPC ............ B29C 33/44; B29C 2035/0827; B29C 37/0003; B29D 11/00365
USPC .................. 264/1.32, 1.36, 1.38, 2.2, 2.3, 334
See application file for complete search history.

(56) References Cited

U.S. PATENT DOCUMENTS

| | | | | |
|---|---|---|---|---|
| 5,298,366 A | | 3/1994 | Iwasaki | 430/321 |
| 5,629,800 A | | 5/1997 | Hamblen | 359/565 |
| 5,718,849 A | * | 2/1998 | Maus et al. | 264/2.2 |
| 6,099,283 A | * | 8/2000 | Soane et al. | 425/123 |
| 6,103,148 A | * | 8/2000 | Su et al. | 264/1.38 |
| 6,171,885 B1 | | 1/2001 | Fan | 438/70 |
| 6,410,213 B1 | | 6/2002 | Raguin | 430/321 |
| 6,482,669 B1 | | 11/2002 | Fan | 438/70 |
| 6,822,799 B2 | | 11/2004 | Kitamura | 359/622 |
| 6,909,554 B2 | | 6/2005 | Liu | 359/626 |
| 7,009,772 B2 | | 3/2006 | Hsiao | 359/619 |
| 7,372,497 B2 | | 5/2008 | Weng | 348/340 |
| 7,399,421 B2 | | 7/2008 | Jacobowitz | 216/24 |
| 7,486,854 B2 | | 2/2009 | Van Ostrand | 385/31 |
| 7,515,357 B2 | | 4/2009 | Segawa | 359/740 |
| 7,518,676 B2 | | 4/2009 | Minoura | 349/113 |
| 7,522,314 B2 | | 4/2009 | Atkins | 358/3.27 |
| 7,524,770 B2 | | 4/2009 | Park | 438/713 |
| 7,531,104 B1 | | 5/2009 | Hwu | 216/80 |
| 2002/0104823 A1 | | 8/2002 | Cunningham | 216/24 |
| 2005/0018595 A1 | * | 1/2005 | Conroy et al. | 264/1.33 |

OTHER PUBLICATIONS

Victor Lien et al, "Microspherical surfaces with predefined focal lengths fabricated using microfluidic capillaries", Applied Physics Letters, vol. 83, No. 26, pp. 5563-5565 (2003).

* cited by examiner

*Primary Examiner* — Timothy Kennedy
(74) *Attorney, Agent, or Firm* — Steven Chu; Ido Tuchman

(57) ABSTRACT

A method and system for enhanced demolding of injection molded optical devices are disclosed. In one embodiment the system includes a metal moldplate without a coat of release layer and a curing device that generates high intensity pulses of UV light. The method includes: providing a moldplate made of a predetermined moldplate material; directly injecting optical material into cavities of a moldplate without a release layer; rapidly curing the injected optical material with high intensity pulses of UV light such that a predetermined optical device is formed; and separating the thus formed optical device from the cavities of the moldplate due to a differential thermal expansion between the optical device material and the moldplate material.

12 Claims, 6 Drawing Sheets

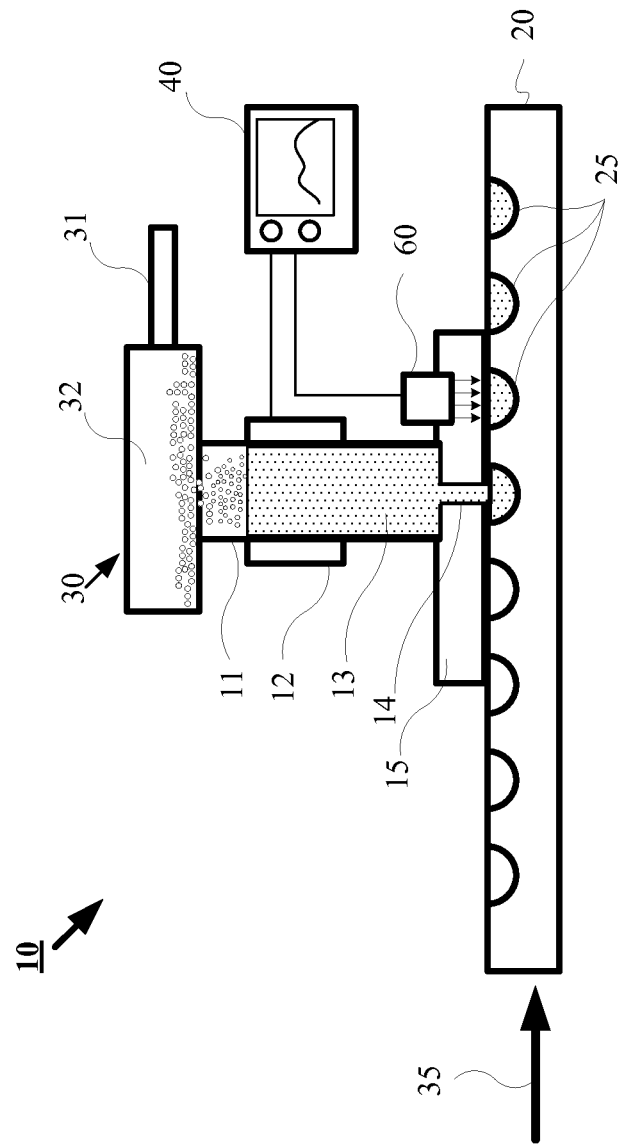

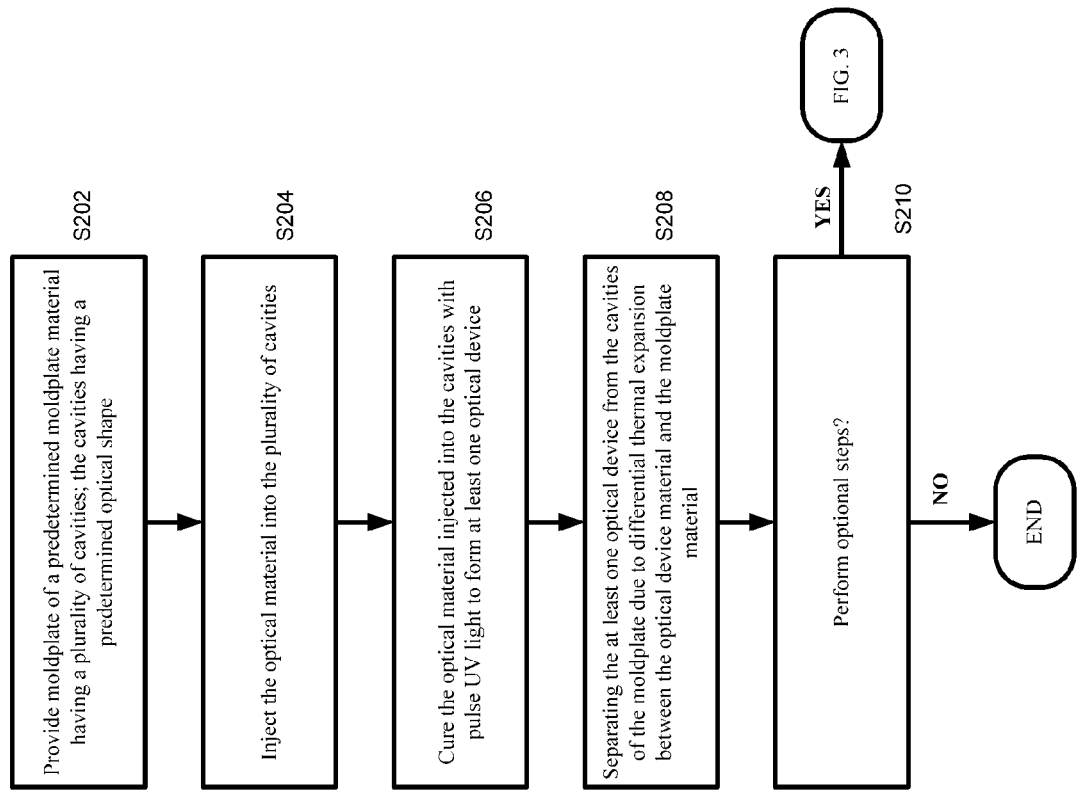

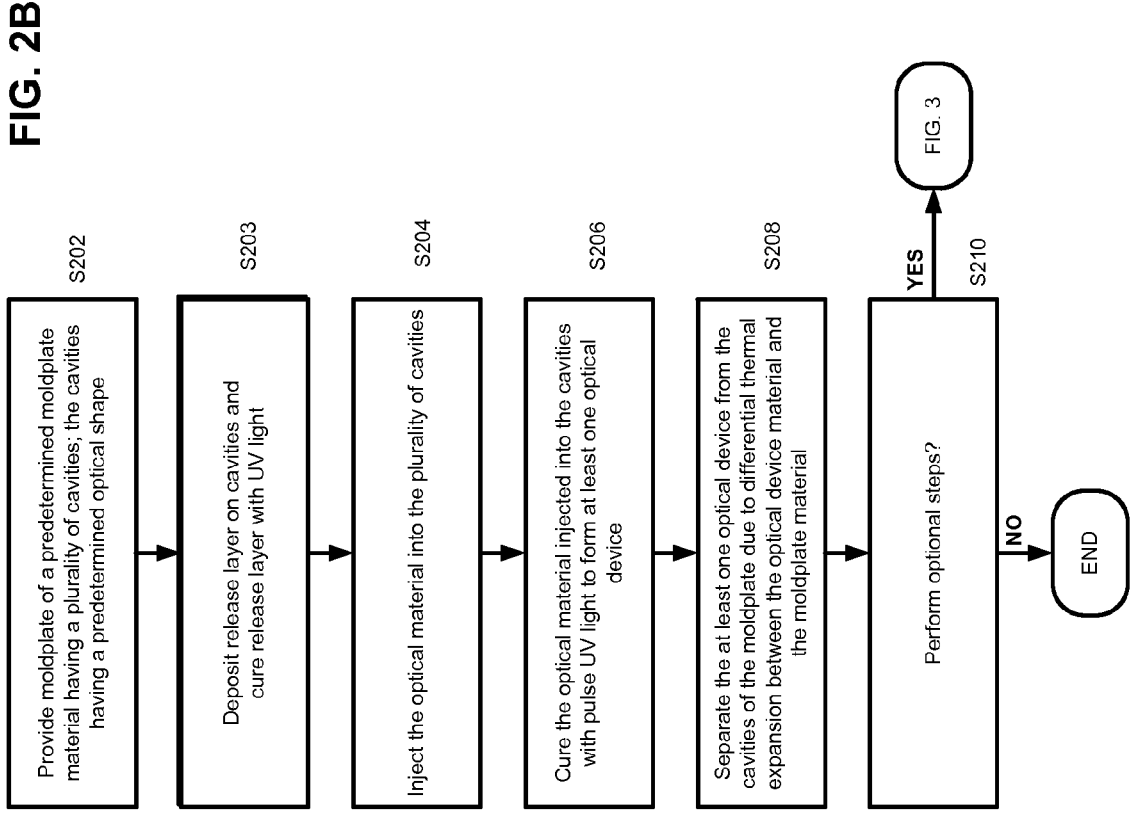

ENHANCED SEPARATION OF INJECTION MOLDED MICROLENSES FOR HIGH VOLUME MANUFACTURING

CROSS-REFERENCE TO RELATED APPLICATIONS

This application is related to copending applications U.S. patent application Ser. No. 12/603,567 and U.S. patent application Ser. No. 12/603,569, filed concurrently herewith. The disclosure of the related applications is herein incorporated by reference in its entirety for all purposes.

FIELD OF INVENTION

The present invention relates to injection molding of objects, and more specifically, to a method and system for enhanced separation of injection molded optical devices from a moldplate. The optical devices are preferably in the micro or nanometer scale.

BACKGROUND OR RELATED ART

Injection molding is a manufacturing process for producing parts by feeding material (typically a polymer) into a heated barrel, whereby the material is heated to an appropriate melting temperature and forced into a mold cavity where the material cools and hardens to the configuration of the mold cavity. Injection molding of optical devices, such as lenses, filters or optical waveguides, includes injecting an optical-grade material (hereafter "optical material") into cavities of a pre-fabricated moldplate where the cavities of the moldplate are typically configured with a predetermined optical shape. The optical material is then cured and the desired optical device with the predetermined optical shape is formed inside the cavities. The thus formed optical device is then extracted from the moldplate using a vacuum chuck or a similar mechanical apparatus. Injection molding is advantageous because it allows for high production output rates; close tolerances in small parts are achievable with properly fabricated moldplates and correct control of the injection process; no post production is required; scrap material may be reused; and full automation is possible. However, some complications of the injection molding process are burning or scorching of parts due to melt temperature being too high or curing cycle time being too long; warping of parts due to uneven surface temperature of the moldplate cavities; surface imperfections and bubbles due to incomplete filling, surface cracking due to rapid change of temperature, and the like. More importantly, in the injection molding of optical devices, removing the newly formed optical device from the moldplate cavities is often difficult, in particular if the optical material remains adhered to the walls of the cavities.

To prevent or minimize adhesion of the optical material to the moldplate, conventional injection molding processes use a conformal coat of release layer which is deposited and cured on the moldplate prior to curing the optical material. The release layer facilitates release of the optical device from the moldplate once the optical device has been formed. However, in order to ensure quality in the optical device, the release layer is sacrificed when the optical device is removed from the moldplate, and a new release layer is applied for the injection molding of a new optical device. Thus, the conventional "demolding" process and recoating of the moldplate is disadvantageous to the overall optical device production process due to potential damage that the demolding mechanical apparatuses may cause to the surfaces of the optical devices and/or to the surfaces of the moldplate. Moreover, the time and expense required for applying a new coat of release layer can render the injection molding process excessively costly.

SUMMARY

In view of the foregoing disadvantages and other considerations, an embodiment of the present application overcomes the existing problems and facilitates expeditious removal of optical devices from a moldplate by rapidly curing the optical material with intense ultra violet (UV) light pulses, which promotes a controlled differential thermal expansion between the optical device material and the moldplate material. This differential thermal expansion causes the optical material to naturally contract away from the moldplate material due to shrinkage of the optical device material which occurs at a higher rate than a shrinkage of the moldplate material. Preliminary experimental data indicate that if an appropriate optical-grade polymer material is exposed to relatively intense (e.g., 3-4 W) pulses of UV light, the polymer optical material shrinkage occurs very quickly and can be on the order of several percent in volume of the optical material. The polymer shrinkage is sufficiently uniform and does not affect the profile of the optical device. In the injection molding of microlenses, for example, an at least 1% shrinkage can cause the microlenses to separate from the moldplate cleanly without the need for additional mechanical dislodging. As a result, using this approach, a large number of optical devices can be cured and demolded in a single processing step, rather than requiring multiple steps as in conventional approaches. In addition, by using this approach, it is possible to use a thinner coating of release layer for most optical device geometries, or to eliminate the need for the release layer in at least some optical device geometries. Accordingly, this approach not only simplifies the molding process and reduces cost, but also allows for the moldplates to be reused as may times as desired, barring mechanical damage during handling, without having to replace the conformal coat of release layer.

In accordance with at least one embodiment, a method for injection molding optical devices and subsequent separation of same includes the steps of: providing a moldplate made of a predetermined moldplate material; directly injecting optical material into cavities of a moldplate without a release layer; rapidly curing the injected optical material while still in the moldplate such that a predetermined optical device is formed within the cavities of the moldplate; and separating the thus formed optical device from the cavities of the moldplate due to a controlled differential thermal expansion between the optical device material and the moldplate material.

Preferably, the curing step includes exposing the optical material injected into the cavities to pulsed UV light at a predetermined power; the predetermined moldplate material includes at least one of a metal and a glass; the optical material includes a polymer material or a material susceptible to photopolymerization; the optical material forming the optical device material shrinks at least 1% by volume of the optical device; and the optical device material shrinks at a higher rate that the moldplate material.

In an alternate embodiment, the method further includes: depositing a conformal coat of release layer on surfaces (e.g., walls) of the moldplate cavities and curing the release layer prior to curing the optical material. In such an embodiment, curing the optical material can be achieved by exposing the optical material and the release layer the pulsed UV light at only half of the predetermined power than when no release layer is provided. Furthermore, in the alternate embodiment, the thickness of the release layer is reduced by approximately 50% in response to undergoing curing with the pulsed UV light. A system for carrying out the method is also disclosed. The system and methods may be preferably advantageous in the injection molding of optical devices in the micro or nanometer scale with symmetrical geometries. Optical devices with symmetrical geometries may be preferred because the forces for separating the optical device material from the moldplate material will be symmetrical due to the fact that differential thermal expansion is isotropic for most solids.

Other embodiments and advantages thereof may be readily inferred by persons of ordinary skill in the art, when reading the detailed description of the disclosure in reference to the attached drawings.

BRIEF DESCRIPTION OF THE SEVERAL VIEWS OF THE DRAWINGS

FIG. 1 is a schematic representation of an exemplary injection molding system, as contemplated by one embodiment of the present invention.

FIG. 2A shows a flow chart illustrating example method steps for the fabrication of optical devices by an injection molding process, as contemplated by one embodiment of the present invention.

FIG. 2B shows a flow chart illustrating example method steps for the fabrication of optical devices by an injection molding process, as contemplated by a further embodiment of the present invention.

DETAILED DESCRIPTION

Figure 3:
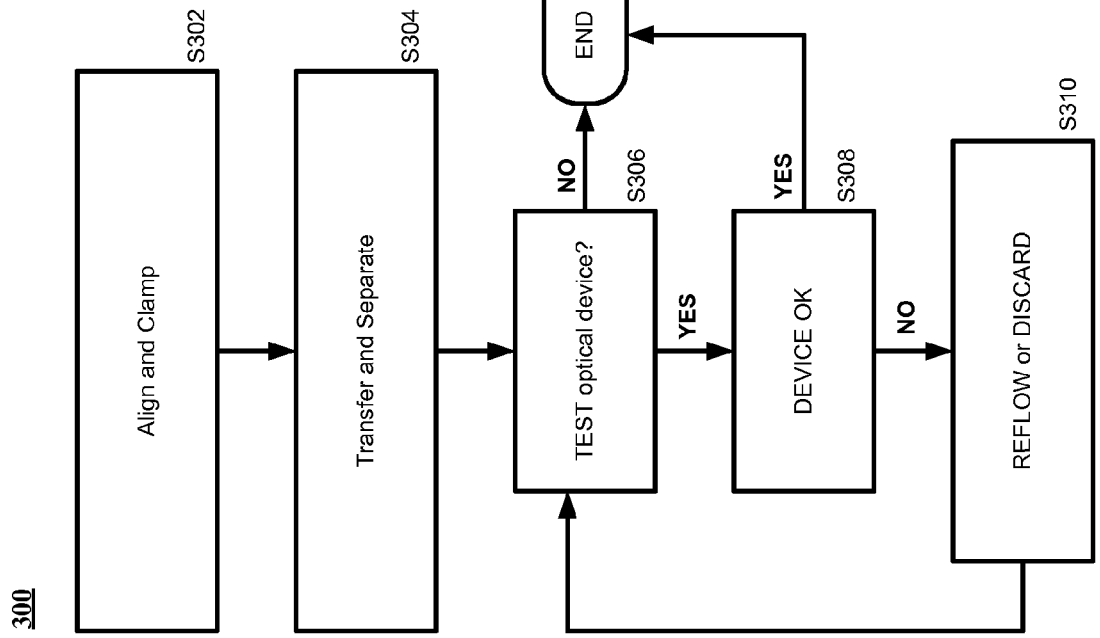
FIG. 3 illustrates exemplary steps for a post injection process, in accordance with an embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof. In the following description, reference is made to the accompanying drawings where like reference numerals refer to like parts throughout the disclosure.

Thermal Expansion

Because the embodiments of the present invention are partly based on the concept of thermal expansion, it is convenient to discuss such a concept before delving in the details of the various embodiments. The concept of thermal expansion is related to the change in dimensions of a substance when the temperature of such a substance changes under constant pressure. For example, solids typically expand in response to heating and contract on cooling under normal atmospheric pressure. This dimensional change in response to temperature change is attributed to changes in the energy that is stored in the intermolecular bonds between atoms, and is expressed in terms of the material's coefficient of thermal expansion (CTE). The coefficient of thermal expansion is a thermodynamic property of all materials. Different coefficients of thermal expansion can be defined depending on whether the expansion of a substance is measured by linear thermal expansion, area thermal expansion or volumetric thermal expansion; these are closely related to each other. The volumetric thermal expansion can be defined for solids and liquids, while linear thermal expansion can only be defined for solids. Volumetric thermal expansion is of particular interest to the subject of injection molding disclosed in this application. Volumetric thermal expansion is given by the change in volume per unit volume of a substance produced by a 1° C. increase in temperature. For exactly isotropic materials (most metals), the volumetric CTE is very closely approximated as three times the linear CTE.

For any given substance, the linear CTE is typically a number expressed in terms of $10^{-5}/°$ C. The value of a particular solid's linear CTE is multiplied by 0.00001 per ° C. For quartz, for example, the coefficient of linear expansion is 0.05. By contrast, iron has a linear CTE of 1.2. This means that iron is 24 times more likely to expand or contract than quartz as a result of changes in temperature.

The volumetric CTE is expressed in terms of $10^{-4}/°$ C., or 0.0001 per ° C. Glass has a very low coefficient of volumetric expansion, 0.2; and that of Pyrex glass is extremely low; it is only 0.09. For this reason, items made of Pyrex are ideally suited for cooking, for example. Similarly, this is one of the reasons why glass has been the material of choice for the fabrication of optical components for many centuries. However, glass is not well suited for fabricating optics at the micro and/or nanometer scale because at such dimensions glass can easily break and very precise surface tolerances cannot be maintained.

In the current state of the art of injection molding, low precision optics are routinely fabricated of known polymers. However, high-precision polymer optical components are very difficult to fabricate by the method of injection molding. One of the reasons for this difficulty is that very high temperatures are required to melt the polymer optical material for injection, but at the same time, rapid cooling of the molten material is desired for efficient production. This fast change in temperature often causes damage to the cooled polymer and prevents the formation of an optical device with highly precise dimensions. In accordance with at least one embodiment of the present invention rapid changes in temperature are prevented and highly precise optical devices, in particular at the micro and nanometer scale are achievable by controllably curing the polymer material with pulsed high intensity UV light. In this manner, differential thermal expansion between the optical device material and the moldplate material naturally dislodges the optical device from the moldplate cavities, while maintaining the highly precise dimensions of the optical device.

Photopolymerization and Materials Therefor

Photopolymerization is broadly defined as the reaction of monomers to produce polymeric structures by light-induced initiation (excitation of a photoinitiator) and subsequent polymerization. The general concept of photopolymerization is to conjugate and solidify fluid reactants into a desired stable structure by using light. Parameters that influence the monomer-to-polymer conversion include temperature, wavelength and intensity of the light, monomer functionality and reactivity, photoinitiator concentration, and others. Relevant polymer temperature parameters are crystalline melting temperature $T_m$ and glass transition temperature $T_g$. $T_m$ is the melting temperature of a crystalline polymer, while $T_g$ is the temperature at which an amorphous polymer takes on the characteristic properties of the glassy state (e.g., brittleness, stiffness, and rigidity). In addition, the effects of photoinitiator concentration and light intensity on curing depth are of particular interest in the photopolymerization process because the curing depth corresponds to the thickness attainable by this process. As a result, in the context of the present application, the photopolymerization process may control the optical material properties such as adhesion, optical index, amount and rate of shrinkage, as well as thickness of the optical device. For this reason, it is possible to select appropriate optical materials susceptible to photopolymerization that can promote a faster demolding process by differential thermal expansion between the optical device material and the moldplate material.

Optical materials susceptible to polymerization can be selected in accordance with particular applications' parameters including the size, curvature, index of refraction and the like of the desired optical device to be fabricated. Examples of photopolymerizable materials suitable for optical applications are photopolymers such as polyacrylamide resin, polymethylmethacrylate (PMMA) resin, or other photo-curable resins. Accordingly, at least in some embodiments of the present application, materials susceptive to photopolymerization may be selected from the group consisting of PMMA, polyimides, polycarbonates, polyacrylics, and others.

System for Injection Molding of Optical Devices and Enhanced Separation Thereof

At least one embodiment of the present invention discloses a system and method for the formation of optical devices such as lenses and the like by an injection molding process. In particular, a method for eliminating and/or minimizing a conformal coat of release layer from conventional injection molding systems is disclosed. In accordance with at least one embodiment, the present invention enables expeditious removal of optical devices from a moldplate by: directly injecting optical material into selectively designed cavities of a moldplate without the release layer; rapidly curing the injected optical material in a controlled manner with high intensity actinic radiation immediately after the material is injected such that a predetermined optical device is formed from the injected optical material; and separating the thus formed optical device from the cavities of the moldplate solely due to a differential thermal expansion between the optical device material and the moldplate material. Optionally, subsequent or concurrent with the separating step, the optical device may be transferred onto an active optoelectronic device or the like, as more fully discussed in the "Post-injection Processes" section described herein below.

The teachings of the present invention may be preferably applicable to the manufacture of optical devices in the micro and/or nanometer scale, such a microlenses, microfilters, nano-optical waveguides and the like, which are typically formed as planar optic arrays. Optical devices with symmetric geometries such as spherical sections are preferred since the forces generated by the differential thermal expansion between the optical device material and the moldplate material are strategically controlled to be symmetrical and thus less likely to deform or damage the optical device. However, the systems and methods disclosed herein may also be applicable to injection molding processes for the fabrication of optical devices with dimensions other than micro and/or nanometer scale.

FIG. 1 is a schematic representation of an exemplary injection molding system 10 for use in the method, as contemplated by one embodiment of the present invention. Injection molding system 10 includes a moldplate 20, an injection machine 30 and a control station 40. The moldplate 20 is preferably made of a predetermined moldplate material having a low coefficient of thermal expansion, such as metal (e.g., molybdenum or nickel), silicon graphite, glass or other materials. The moldplate 20 includes a plurality of cavities 25 configured to receive an appropriate optical material 13 within the walls of the cavities. Each of the cavities 25 is preferably made to conform to a predetermined optical shape. That is, each cavity 25 may be designed with at least a preferred radius of curvature, diameter and thickness of the desired optical device. In this embodiment, optical shapes of a symmetrical geometry such as lenses and filters are preferred.

Moldplate 20, as stated above, may be preferably fabricated of a material having a low coefficient of thermal expansion. For purposes of illustration, it is preferable that the CTE of the moldplate material be much lower than the CTE of the optical material such that the optical device material shrinks at a higher rate that the moldplate material. More specifically, it is preferable that the CTE of the optical device material and the CTE of the moldplate material differ by at least 10%. In this manner, the moldplate material would shrink a 10% of the amount of shrinkage experienced by the optical device material.

The injection molding machine 30 (injection device) may include a material hopper 32 with a pressure inlet 31, a heated barrel 11 that is heated by a heating element 12, a filling platen 15 including therein an injection nozzle 14, and a control station 40. The injection molding machine 30 is preferably configured to heat the optical material 13 to an appropriate molten state (preferably liquid), so that the molten optical material 13 may be injected into the mold cavities 25 in a uniform and efficient manner. To that end, the temperature of the optical material 13 may be controlled by the control station 40 by regulating the heating device 12. Regulating the heating device 12 may include, for example, increasing and/or decreasing the temperature that the heating device 12 applies to heated barrel 11 such that the optical material 13 is kept at a substantially steady and uniform temperature. Preferably, the temperature of the optical material 13 is kept at a substantially steady-state melting point temperature in the range of 150 to 250° C.

In addition, the injection pressure of the optical material 13 may need to be regulated to promote expedited filling of optical material 13 into the plurality of cavities 25, and to hold (or push) the optical material 13 against the surfaces (e.g. walls) of the cavities for at least a predetermined period of time (hold period) so as to lock-in the geometrical shape and dimensions of the optical device. Thus, the shape or optical profile of the desired optical device is predetermined by the shape or profile of the cavities, as well as the controlled shrinkage of the optical material. To provide appropriate injection pressure, a pressure inlet 31 may be implemented based on particular application requirements, such that—for example—the molten optical material 13 is uniformly fed (at a predetermined pressure and speed) from the heated barrel 11 into cavities 25 through at least one injection nozzle 14 located in the body of the filling platen 15.

A curing device 60 is provided preferably supported by, or attached to, the filling platen 15. In this manner, each cavity being filled with optical material 13 passes below the curing device 60 as the molding plate 20 moves in a scanning or step mode in direction 35. Alternatively, the injection machine 30 can move in a scanning or step mode in a direction opposite to direction 35, so as to rapidly and efficiently fill each cavity 25 with optical material 13. Moreover, either the moldplate 20 and/or injection machine 30 may be configured to move with respect to each other in more than one direction, if appropriate and necessary.

In the embodiment of FIG. 1, the curing device 60 is preferably a source of electromagnetic radiation that can produce photochemical reactions, also know as "actinic radiation". For example, curing device 60 may preferably be a pulsed ultra violet (UV) light source, such as a UV laser, capable of delivering high intensity pulses of actinic radiation in a range from about 254 nm to 365 nm. The curing device 60 may be controlled by control station 40 so as to deliver specific pulse power, pulse intensity and/or pulse duration to optical material 13. The pulse duration, number of pulses, and other details could vary depending on the specific optical material chosen and the geometry of the optical device to be fabricated. For illustrative purposes, about 3-4 watts (W) of UV energy, delivered in a train of perhaps 5 pulses each tens of microseconds long to achieve at least 1% shrinkage by volume of the optical device material may be preferable. In this manner, it is possible to create sufficient differential thermal expansion between the optical device material and the moldplate material such that the optical device is separated and released from the moldplate cavity without the use of mechanical tools.

In other embodiments of the present invention, the curing device 60 may not be limited to a pulsed UV source alone. There are various sources of radiation that may be used as curing device 60. For example, actinic radiation from a variety of sources can be used, including commercial ultraviolet fluorescent tubes, medium, high, and low pressure mercury vapor lamps, argon glow lamps, photographic flood lamps, pulsed xenon lamps, carbon arc lamps, and the like. As long as the curing device is capable of achieving the at least 1% shrinkage by volume of the optical device material in a short period of time and without damaging the optical device, it may be possible to create sufficient differential thermal expansion between the optical device material and the moldplate material such that the optical device is separated and released from the moldplate cavity without the use of mechanical tools.

Optical Materials

Advantages of forming optical devices by an injection molding process include superior optical shape control because the optical devices are shaped by the cavity shape, rather than by surface tension as in conventional processes such as embossing, casting or compression. In FIG. 1, as described above, injection machine 30 is configured to inject an optical device material 13 in a molten state dispensed from the filling platen 15 through the injection nozzle 14 onto cavities 25.

The preferred materials for optical devices, in particular for devices in the micro and/or nanometer scale may include polymers, photopolymers, glasses, sol-gels, UV-curable epoxies, resins, acrylics, cycloolefins, polycarbonates, PMMA (polymethyl methacrylate), polyimide, glass semiconductors such as $Ge_xSe_{1-x}$, and, combinations thereof. In addition, polymeric composites having a high transparency, low coefficient of thermal expansion and minimum change of coefficient of refractive index with temperature are preferable. Such polymeric composites may be made from a suitable thermoplastic polymer and index-matched glass or ceramic.

Thermoplastic polymers suitable for the composites may belong to any known class of polymers including polyvinyls, polyamides, polyesters, polyolefins, polycarbonate, polyamide, polyimide, polyesteramide, polyketones, polyetherketones and the like and mixtures thereof. Polyolefins include polyalkenes (such as, for example, polyethylene, polypropylene, polybutylene), polystyrene, and polymers containing cyclic olefin moieties. Suitable glasses or ceramics are those which closely match the selected thermoplastic in refractive index over a wide wavelength range as well as give optimal properties to the composite. Any refractive index or CTE mismatch between the glass (or ceramic) and the polymer should be kept at the lowest possible in order to obtain transparent composites that can be efficiently injected and cured during the injection molding process.

Moldplate Structure and Material

Cavities with desired geometry can be created in a metal or glass mold by known processes to meet the requirement of the desired optical device. Known processes such as reactive ion etching (RIE), deep reactive ion etching (DRIE), laser ablation, machine tooling, and the like may be suitable for fabricating moldplates with cavities of a predetermined optical shape. However, in order to achieve the results and advantages expected in accordance with the various embodiments of the present invention, it may be preferred that a moldplate material may be selected (predetermined) in accordance with at least one or more of the following parameters: Parameter 1: a predetermined moldplate material made of a material having a low coefficient of thermal expansion is highly desirable. For illustration purposes, the coefficient of thermal expansion of the moldplate material may be at least 3 times, or more preferably 10 times, lower that the coefficient of thermal expansion of the optical material. Parameter 2: In order to obtain uniform separating forces between the moldplate material and optical device material, a moldplate material with isotropic thermal expansion properties may be desirable. Parameter 3: it may also be preferable that, during the curing process that leads to the formation of the optical device, the moldplate material shrinks at a lower rate than the optical device material. Parameter 4: a moldplate material with a high melting point (i.e., high resistance to temperature) may be desirable. High resistance to temperature is desirable to improve wear resistance and lifespan of the moldplate. One example of a predetermined moldplate material that would meet most of the above parameters is molybdenum or molybdenum alloys.

Molybdenum is a Group 6 chemical element, which has the sixth-highest melting point (2,623° C. (4,753° F.)) of any element. It has low water solubility (thus resistant to corrosion) and readily forms hard, stable carbides, and for this reason is often used in high-strength steel alloys. Although it is not a naturally occurring element, molybdenum's linear coefficient of thermal expansion is $4.9 \times 10^{-6}/°$ C. at temperatures from 20 to 500° C. Accordingly, in some embodiments, it may be preferably that at least part the predetermined moldplate be made of molybdenum or some equivalent metal or alloy. For example, in some embodiments the entire moldplate and cavities may be fabricated of a bulk metal such as molybdenum. In other embodiments, moldplates of other materials with cavities covered with a fine-grained permanent metallic coating may also be suitable. For example, U.S. Pat. No. 7,320,832 (hereafter "patent '832) to Palumbo et al. discloses permanent substrates made of fine-grained metallic coatings of low coefficient of thermal expansion suitable for precision molds; and various patents cited in patent '932 teach the fabrication of molds/tooling using low CTE Invar. Patent '832 is incorporated herein by reference for all purposes.

In the foregoing paragraph, the preferred material for the moldplate is a metal, in particular molybdenum or alloys thereof. The metal moldplate is preferred because the coefficient of thermal expansion of a metal is expected to be different from (i.e., not matched to) the CTE of the optical device material (e.g., a polymer). In this manner, during the curing process, the optical device material 13 would shrink at a higher rate that the material of moldplate 20. However, instead of metal, the moldplate may also be made of other materials. For example, in some embodiments, specialized glass or quartz moldplates may be used. Indeed, any material suitable for fabricating a mold with highly precise cavities may be used, as long as there is sufficient differential thermal expansion between the moldplate material and the optical device material. Moreover, it should be noted that in some embodiments regardless of the moldplate material, the desired level of shrinkage in the optical device material may be obtained by selecting an appropriate optical device material that photopolymerizes sufficiently fast at high intensity UV pulses, so as to prevent any significant thermal expansion changes or stresses in the moldplate material.

By providing a moldplate with the advantages and parameters as set forth above, it is possible to manufacture the desired optical device of a predetermined optical shape by injecting the optical device material directly into the moldplate cavities. As a result, at least in some embodiments, it is possible to eliminate the conformal coat of release layer and to improve the injection molding process without affecting the quality and high precision of the optical device product. Eliminating the need for a conformal coat of release layer in the moldplate cavities is a significant feature of the present invention over known state of the art because a moldplate without the coat of release layer can reduce the overall injection processing time and can also reduce the expense required for a new coat of release layer.

In the case that the moldplate material is glass, the surfaces of the cavities of the moldplate may be exposed to specialized plasma discharge apparatuses to obtain hydrophobic or hydrophilic surfaces, to thereby eliminate the need for a release layer. However, it should be noted that creating hydrophobic or hydrophilic surfaces is not practical for a metallic (i.e., conductive) surface, as compared to a glass (i.e., dielectric) surface because in the metallic moldplate is not practical to sustain the polarity differences on a conductive surface. It is for this reason, that a metal moldplate made of molybdenum (or alloys thereof) may be preferable for eliminating the need for a conformal coat of release layer.

Moldplate with Conformal Release Layer

Alternatively, in other embodiments, it is possible to at least minimize the thickness of the coat of release layer, increase the lifespan of the moldplate, and improve the efficiency of the injection molding process by providing only a thin conformal coat of release layer on the cavities of the moldplate. Specifically, in the case that a thin coat of release layer is used, the thin conformal coat of release layer will not only cure faster prior to injection molding, but also the overall production time will be reduced. In addition, the optical device formed by rapidly curing the injected optical material can be removed from the moldplate even faster than without a release layer because both the optical device material and the coat of release layer shrink due to the differential thermal expansion between the optical device material and the moldplate material. Moreover, during the curing process, the curing device 60 can cure the injected optical material 13 and the coat of release layer with the pulsed UV light at about half of the power that was required when no release layer is provided. Even curing at half the power of the pulsed UV light, it is estimated that the thickness of the coat of release layer would be reduced by approximately 50%, which would further facilitate rapid demolding of the optical devices just formed.

Release Layer

Preferred materials for a release layer may include well known release agents, such as waxes and poly-tetrafluoroethylene (PTFE) coatings. If the moldplate material is glass or equivalent material, a class of materials is well known to form dense, highly ordered monolayer films on silica glass surfaces. These self-assembled monolayers (SAMs) form because of the tendency of trisilanols to form a tight silyl ether network with silanol groups on the glass surface and with silanol groups on neighboring molecules. The self-ordering films come about from the close packing of long chain alkyl groups attached to the trisilanols. For example, when a wet glass surface is dipped into a dilute solution of octadecyltriethoxysilane or octadecyltrichlorosilane, a well ordered monolayer film assembles on the glass surface. Subsequent baking of the film makes a permanent bond of the film to the surface. Because the end group on the long chain alkyl can have a large number of different functional groups, SAMs allow tuning the surface energy of the glass moldplate to promote release of the optical device from the moldplate cavity. The SAMs are robust and can survive multiple reuses. Moreover, if the coat or release layer is damaged, it can easily be removed completely by oxygen ashing and a fresh SAM can be applied.

Process for Separating Injection Molded Optical Devices from a Moldplate

FIG. 2A shows a flow chart illustrating example method steps for the fabrication of optical devices by an injection molding process 200, as contemplated by at least one embodiment of the present invention. The method starts at step S202, by providing an appropriate moldplate (e.g., moldplate 20 in FIG. 1) made of a predetermined moldplate material and having a plurality of cavities configured to receive injected optical material within the walls of the cavities. Preferably, each of the plurality of cavities is configured to have a predetermined optical shape in accordance with a profile of the desired optical device to be fabricated. As noted above, optical shapes of a symmetrical geometry may be preferable for this process.

At step S204, an appropriate optical material is injected into the plurality of cavities in accordance with preferred injection molding parameters. Preferred parameters may include a predetermined optical material temperature, flow rate and pressure for injecting the optical material, viscosity of the optical material and the like. For example, it may be desirable that the optical material be maintained in a molten state (liquid if possible and preferably above the glass transition temperature), by controlling the temperature of the injection molding machine, as described in previous sections of this specification. In addition, optimal behavior of the optical material (e.g., material stress levels caused by thermal expansion/contraction) may be predetermined by numerical simulation and/or empirical experimentation so at to more precisely control parameters such as temperature, injection flow rate and pressure, as well as viscosity of the optical material.

At step S206, after the optical material has been injected into the cavities of the moldplate, the process starts the curing of the optical material to form the desired optical device. Preferably, curing is done with a curing device configured to generate high-intensity pulses of UV light, as describe above in reference to FIG. 1. As previously noted, the pulse duration, number of pulses, and other details could vary depending, among other things, on the specific optical material chosen and the geometry of the desired optical device being formed. For illustrative purposes, about 3-4 W of UV energy, delivered in a train of 5 pulses each being tens of microseconds long to achieve at least 1% shrinkage by volume of the optical material may be suitable for some applications. In other applications, for different material sets and/or different optical device geometries, UV pulses of different energy and different pulse duration, or even continuous UV or other type of radiation, may be required, as will be apparent to those skilled in the art. It should be noted, however, that high energy pulses of electromagnetic radiation in the UV range are preferable because UV has the highest energy due to its short wavelength. Nevertheless, other EM radiation wavelengths may also work. Pulsed EM irradiation is preferred to encourage the differential thermal expansion or photopolymerization forces to separate the optical device more gradually from the moldplate cavities.

At step S208, the separation of the optical device from the cavities occurs spontaneously due to the differential thermal expansion between the optical device material and the moldplate material. Once the optical device naturally dislodges from the cavities of the moldplate, at step S210, optional steps may be performed. If optional steps are required, the process advances to FIG. 3. Alternatively, if optional steps are not required at step S210, the optical device is removed from the cavities, preferably without the use of removing forces or mechanical tools so as to prevent damage of the newly formed optical device, whereby the demolding process ends.

Optional steps may be required, for example, when the newly formed optical device should be transferred onto an optoelectronic device. Specifically, it is contemplated by the present invention, that the above-described injection processes may be applicable to the fabrication of optical devices in the micro or nanometer scale. Micro or nanometer scale optical devices are often fabricated in arrays suitable for wafer-scale processing. Accordingly, such micro or nanometer scale optical devices may need to be transferred to appropriate wafer-scale processing, as more fully described in the following sections in reference to FIGS. 3-5.

Alternatively, as previously noted, the above-described injection process may be applicable to the fabrication of optical devices in macro scale. For example, optical devices such as lenses and/or filters for standalone imaging electronic devices such as cameras, projectors, scanners and the like. In the case that the newly formed optical device is in the macro scale, no additional steps may be required after the optical device has naturally retracted away from the cavities of the moldplate. Accordingly, the process ends after step S210 (i.e., after removing the newly formed optical device from the moldplate cavities without the use of mechanical demolding devices).

FIG. 2B shows a flow chart illustrating example method steps for the fabrication of optical devices by an injection molding process 201, as contemplated by an alternate embodiment of the present invention. Steps S202 and steps S204 to S210 of process 201 of FIG. 2B are substantially similar to corresponding steps S202 and S204 to S210 of FIG. 2A. Accordingly, repetitive description thereof is omitted for brevity. One notable difference, as compared to process 200, is that process 201 includes the extra step S203. At step S203 of process 201, a conformal coat of release layer is deposited by conventional techniques on the surfaces of the cavities of the moldplate (e.g. on cavities 25 of moldplate 20 illustrated in FIG. 1).

In accordance with the embodiment of FIG. 2B, a conformal coat of PTFE or other release materials can be deposited on the surfaces of the moldplate cavities so as to enable faster release of the optical device material due to differential thermal expansion or photopolymerization effects. In particular, it is noted that the addition of the release layer to the surfaces of the moldplate cavities advantageously facilitates the rapid curing of the optical device material. Specifically, since the conformal coat of release layer already prevents adhesion of the optical material to the surfaces (walls) of the cavities, the volumetric thermal expansion (i.e., shrinking) of the optical device material required for separating the optical device from the moldplate is less than what is required when the release layer is not present. For the same reason, the thickness of the release layer can be substantially reduced, as compared to the thicknesses of conventional release layers. Moreover, it is estimated that—during the curing step—both the optical device material and the release layer may shrink (depending on the choice of materials) due to the differential thermal expansion and/or photopolymerization effects. As a result, it is estimated that the energy of the UV pulses needed for rapidly curing the injected optical material can be reduced by approximately half, as compared to the energy required when the release layer is not present. Indeed, it is possible that the wavelength and energy power of the pulsed UV source can be selected in accordance with at least one of the materials of the release layer, the moldplate and/or the optical device to be molded (or the corresponding CTE of each of those materials) in a preferential manner to achieve optimal curing and separation efficiency. Moreover, it would be preferable that the predetermined power and a wavelength range of the pulsed UV light are selected in accordance with a coefficient of thermal expansion of the optical device material, the moldplate material, or a combination of both, so that the optical device material is cured and separated from the moldplate cavities as fast as reasonably possible.

Post Injection Processes

FIG. 3 illustrates exemplary steps for a post injection process, in accordance with an embodiment of the present invention. A post injection process may be desirable or even required, for example, in instances in which the newly formed optical device(s) is of the micro or nanometer scale, and a transfer of the optical device onto a wafer-scale device is appropriate. For example, if the newly formed optical device is a microlens or microfilter, such a device may be transferred onto an active optoelectronic device such as a photodiode, a photo detector or the like, so that wafer-scale assembly may take place. Alternatively, a post injection process may be desirable for inspecting the newly formed optical device(s) to confirm that the desired optical shape and properties have been achieved.

Figure 4A:
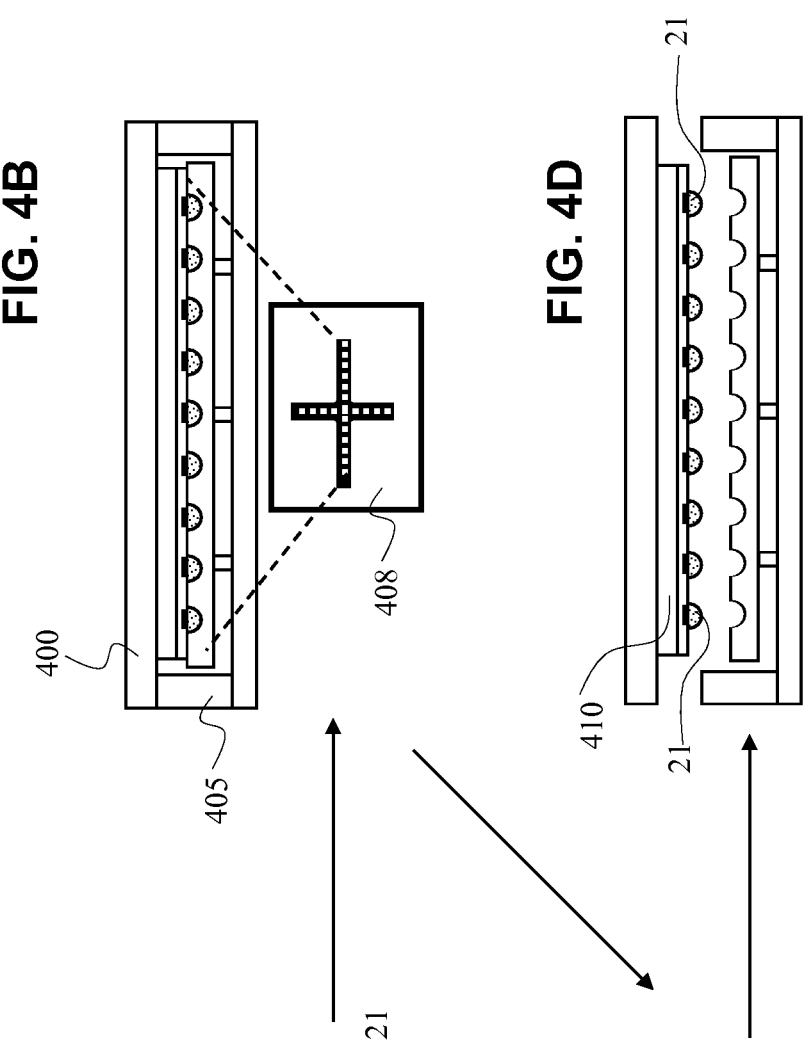
FIGS. 4A to 4D show a process sequence for alignment, clamp, transfer and separation of newly formed optical devices in the post injection process of FIG. 3.
Figure 4B:
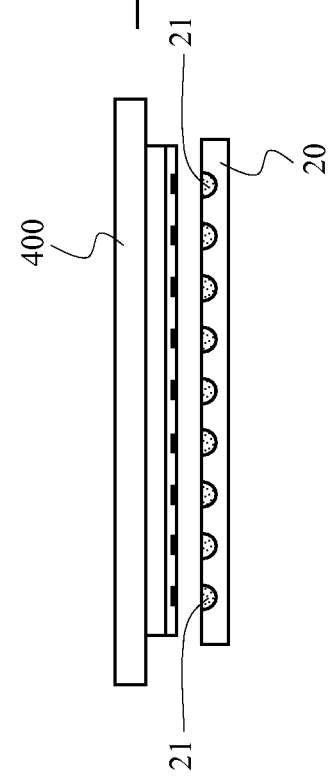

In FIG. 3, post injection process 300 flows from step S210 of either process 200 or 201. At step S302, after the optical device has been cured, but prior to removal, the moldplate 20 (in FIG. 1) containing therein the newly formed optical device (s) may be aligned with, and clamped onto, an alignment tool 400 using conventional photolithographic techniques, as shown by FIGS. 4A and 4B, respectively. Specifically, FIGS. 4A and 4B show the alignment of moldplate 20 containing newly formed microlenses 21 with an alignment tool 400 and a clamping tool 405 with the use of alignment keys 408.

Figure 4C:
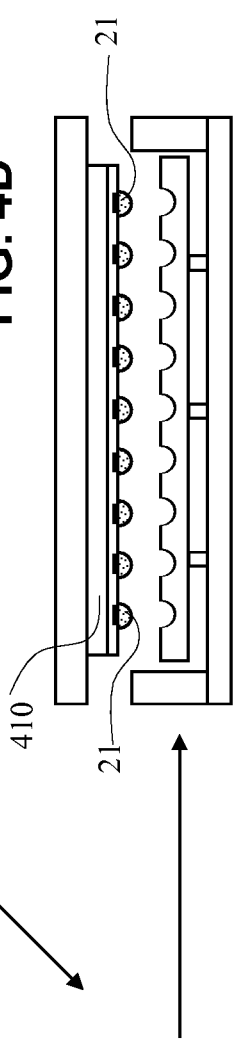
Figure 4D:
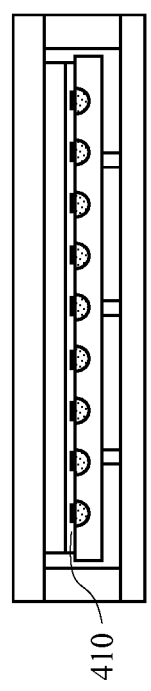

At step S304, as illustrated in FIGS. 4C and 4D, the newly formed optical device or devices, in this case microlenses 21, a transferred onto an active optoelectronic device 410 (FIG. 4C), and subsequently separated therefrom (FIG. 4D) without the use of mechanical devices.

At step S306, after the newly formed optical device(s) have been transferred, the post injection process 300 may be used for testing the newly formed optical device(s). If testing is selected, the process advances to step S308, where appropriate testing is performed and a determination is made as to whether or not the optical device meets predefined parameters such as curvature, diameter, transmittance, refractive index and the like. If at step S308 the optical device meets the predefined parameters, the optical device may be marked as tested and the process ends.

Alternatively, if at step S308, the newly formed optical device does not meet the predefined parameters the process advances to step S310. At step S310, depending on the level of error in the newly formed optical device, an attempt can be made to correct the error and re-test the optical device, or the optical device may simply be discarded. An example of error correction during testing may include submitting the newly formed optical device to the conventional reflow technique so as to modify or improve predefined parameters such as curvature, diameter or index of refraction. In this case, the optical device may successively be determined whether to be tested or not at step S206 until the device meets the predefined parameters or is discarded.

Figure 5:
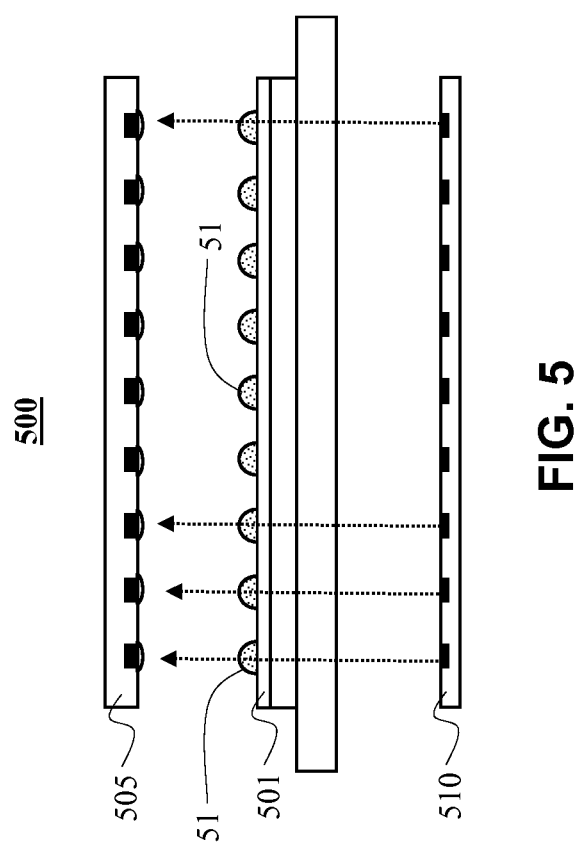
FIG. 5 is an exemplary arrangement for testing newly formed optical devices during the post injection process of FIG. 3.

FIG. 5 shows an exemplary testing arrangement 500 for testing predefined parameters of newly formed optical device(s), such as microlenses 51. In the arrangement of FIG. 5, a plurality of microlenses 51 has been transferred onto a testing platform 501, such as a transparent wafer-scale substrate. An array of different wavelength sources 510 (e.g., laser diodes) may be provided in correspondence with an array of wideband photodetectors 505. In such an arrangement, various testing procedures may be performed so as to test if the microlenses 51 meet predefined parameters. For example, the microlenses' 51 may be tested for focal distance, wavelength response, transmittance levels and the like.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The foregoing embodiments and examples were chosen and described in order to best explain the principles of the invention and the practical application, and to enable others of ordinary skill in the art to understand the invention for various embodiments with various modifications as are suited to the particular use contemplated.

What is claimed is:

1. A method for separating injection molded optical devices from a moldplate, the method comprising:
providing a moldplate made of predetermined moldplate material, the moldplate having a plurality of cavities configured to receive injected optical material within walls of said plurality of cavities, each of said plurality of cavities having a predetermined optical shape;
injecting the optical material into the plurality of cavities of said moldplate;
curing the optical material injected into the plurality of cavities such that at least one optical device is formed from the injected optical material within the cavities of said moldplate, wherein the curing step includes exposing the optical material injected into the cavities to pulsed UV light at a predetermined power, wherein said predetermined power and a wavelength range of said pulsed UV light are selected based on at least one of a coefficient of thermal expansion of the optical device material, a coefficient of thermal expansion of the moldplate material, and a combination of both of said coefficients of thermal expansion; and
separating the formed at least one optical device from the cavities of said moldplate, wherein
the separating step includes the optical device material shrinking and separating from the walls of said cavities due to a differential thermal expansion between the optical device material and the moldplate material.

2. The method according to claim 1, wherein the optical material forming the optical device material shrinks at least 1% by volume of the optical device.

3. The method according to claim 2, wherein the predetermined moldplate material includes at least one of metal and glass.

4. The method according to claim 3, wherein the optical material includes a polymer material.

5. The method according to claim 3, wherein the optical material includes a material susceptible to photopolymerization.

6. The method according to claim 3, wherein the optical device material shrinks at a higher rate that the moldplate material.

7. The method according to claim 2, further comprising the steps of:
depositing a conformal coat of release layer on the walls of said plurality of cavities; and
curing said release layer prior to curing the optical material.

8. The method according to claim 7, wherein the curing the optical material includes exposing the optical material and the release layer to said pulsed UV light at half of said predetermined power.

9. The method according to claim 8, wherein a thickness of the release layer is reduced by approximately 50% in response to undergoing said curing said release layer step.

10. The method according to claim 1, wherein said at least one optical device includes a micro-optical device of a predetermined optical shape and index of refraction.

11. The method according to claim 10, wherein the predetermined optical shape of said micro-optical device includes a symmetric lens geometry.

12. The method according to claim 11, wherein said symmetric lens geometry is determined by the predetermined optical shape of said plurality of cavities.

* * * * *